United States Patent [19]

Negishi et al.

[11] 3,922,719

[45] Nov. 25, 1975

[54] PLAYING METHOD OF TAPE PLAYER AND AN EQUIPMENT THEREOF

[75] Inventors: Tokuji Negishi, Kawaguchi; Motomasa Yoshida, Tokyo, both of Japan

[73] Assignee: Clarion Co., Ltd., Tokyo, Japan

[22] Filed: Dec. 27, 1968

[21] Appl. No.: 787,386

[30] Foreign Application Priority Data

Dec. 29, 1967 Japan .............................. 43-84731
Feb. 3, 1968 Japan .............................. 43-7707

[52] U.S. Cl. ...................... 360/88; 360/93; 360/96
[51] Int. Cl.² ............................................ G11B 5/00
[58] Field of Search ............ 274/4, 11; 179/100.2 Z; 242/55.13, 55.19 A; 226/90, 109

[56] References Cited

UNITED STATES PATENTS

| | | | |
|---|---|---|---|
| 3,385,534 | 5/1968 | Staar | 274/4 |
| 3,401,944 | 9/1968 | De Metrick | 274/4 |
| 3,410,470 | 11/1968 | Metzner | 179/100.2 |
| 3,420,965 | 1/1969 | Townsend et al. | 274/4 |
| 3,437,762 | 4/1969 | Leak et al. | 274/4 |
| 3,495,835 | 2/1970 | Laa | 360/105 |
| 3,531,127 | 9/1970 | Harper | 274/4 R |
| 3,582,965 | 6/1971 | De Metrick | 360/94 |
| 3,591,186 | 7/1971 | Murata et al. | 360/93 |

*Primary Examiner*—Harry N. Haroian
*Attorney, Agent, or Firm*—William Anthony Drucker

[57] ABSTRACT

The invention relates to a method for playing a tape player and the equipment thereof. The cassette type tape cartridge supplying the tape and winding it back between the two reels is fitted into a tape player for playing a tape cartridge in which the tape is wound on a single reel in endless state and this invention provides a new adapter to play it back, thereby on the same tape player it is possible to back the single reel system and the tape cartridge as well as the double reel system cassette type tape cartridge.

7 Claims, 16 Drawing Figures

INVENTORS
TOKUJI NEGISHI AND MOTOMASA YOSHIDA
BY
Linton and Linton
ATTORNEYS

INVENTORS
TOKUJI NEGISHI AND MOTOMASA YOSHIDA
BY
Linton and Linton
ATTORNEYS

INVENTORS
TOKUJI NEGISHI AND MOTOMASA YOSHIDA
BY
Linton and Linton
ATTORNEYS

INVENTORS
TOKUJI NEGISHI AND MOTOMASA YOSHIDA
BY
Linton and Linton
ATTORNEYS

INVENTORS
TOKUJI NEGISHI AND MOTOMASA YOSHIDA
BY
Linton and Linton
ATTORNEYS

INVENTORS
TOKUJI NEGISHI AND MOTOMASA YOSHIDA
BY
Linton and Linton
ATTORNEYS

INVENTORS
TOKUJI NEGISHI AND MOTOMASA YOSHIDA
BY
Linton and Linton
ATTORNEYS

INVENTORS
TOKUJI NEGISHI AND MOTOMASA YOSHID
BY
Linton and Linton
ATTORNEYS

PLAYING METHOD OF TAPE PLAYER AND AN EQUIPMENT THEREOF

This invention relates to a device of playing method of tape player, and provides, a novel method and equipment which engages or disengages a tape cartridge housing a tape therein with and from the tape player, and which adapts to various forms of tape cartridge to be engaged or disengaged in the tape player playing by said engagement, and which is to efficiently play by the same tape player even if a tape cartridge is different in form.

It is the conventional practice to mount a tape player with a cartridge type tape for recording or playing back. It is also well known that for the purpose of transmitting the two driving forces in said cartridge there are a cassette type using reels or the (so-called) Phillips cartridge (represented by Phillips of Holland). This cassette tape cartridge is compact and light weight with various advantages owing to its being a reel system, but in engaging with or disengaging from the tape player said reel must be fitted to the drive shaft. Tnis would be suitable for tape players for indoors, commercial or other uses whose tops are open, but such cassette type tape cartridges cannot engage with or disengage from the tape player which is furnished under the top closed condition as in the cab of a car, as the cartridge can be only inserted in the direction of its length or width and such a pushing operation will not be able to fit the shaft into the reel hole of cartridge which is provided in the direction of thickness of the cartridge. On the contrary to such a cassette type tape cartridge, the so-called Fideli Pac or Lear Jet cartridge can be smoothly applied to the tape player equipped under said top closed condition. That is to say, this Fideli Pac tape cartridge winds an endless tape on one reel, and does not house a pinch roller in the cartridge, and feeds a tape by means of a pinch roller provided in the tape player, while the Lear Jet tape cartridge similarly winds an endless tape on one reel, and this cartridge houses a pinch roller in the cartridge and does not require a drive shaft to be mounted onto the cartridge. Therefore they are ready for playing by only putting these cartridges into the tape players. Each of the cartridges of Fidelic Pac and Lear Jet fairly differs from that of the above mentioned cassette type in the form and in the tape feeding structures, besides since the tape itself differs in width, being 3.125mm for the one and 6.25mm for another cartridge, it is impossible to use the same tape player for both types of cartridges, and it is expensive to provide separate tape player for these two different types of cartridge. Even greater inconvenience and difficulty will arise, if in said narrow cab a plurality of tape players are installed on the part of the dash board or a spare tape player in always kept in the cab to be ready to substitute for the other player. Accordingly in a common passenger car, only a single tape player suiting either of the cassette Fideli Pac type or Lear Jet and the cartridge of adopted type is exclusively employed. Particularly the above stated cassette type is not interchangeable with other types.

The present invention has solved successfully the above mentioned difficulties of the conventional types of cartridge. That is to say, the fundamental object of this invention is to provide a cassette type tape cartridge which is, similar to Fideli Pac or Lear Jet tape cartridge, mounted to be ready for tape feeding with the reel shafts fitting into the two reel holes (at least one of which is driven), merely by inserting in the wide direction, thereby practising the cooperation of the cassette typed tape cartridge and Fideli Pac or Lear Jet one without any changes in the tape player part. As stated above, there are great differences between the cassette typed cartridge and Fideli Pac or Lear jet cartridge in the form, size or operation. It is almost impossible that the same tape players play with such very different cartridges. The present invention is to practice the useful tape feeding relation between the cassette typed tape cartridge and Fideli Pac or Lear Jet cartridge, thereby obtaining the interchangeability between them.

Another object of this invention is to establish interchangeability between said cassette tape cartridge and Fideli Pac or Lear Jet typed tape cartridge, affecting scarecely practically no change in the tape player. In order to obtain this purpose the present invention adopts the special and novel adapter, and especially when using the cassette type tape player, this invention mounts such an adapter on said cassette type tape player. As above described there is a wide difference between the cassette tape cartridge and Fideli Pac or Lear Jet type tape cartridge. Namely the basic difference is the numbers of reels, one or two; not only the shape of cartridge differs very much in itself, but also the tape wound on it greatly differs in width. Of course, there is also a considerable difference between Fideli Pac or Lear Jet, depending on the presence or absence of pinch roller or the numbers of recording tracks, but the size and shape of the cartridge are approximately the same, and the type is equally a one reel, with the same tape width of 6.25mm and nearly the same speed of tape feeding, i.e. 9.5cm/sec. Therefore, it will be easily understood how much more difficult it is to make interchangeable the cassette type cartridge and Fideli Pac or Lear Jet cartridge than to make interchangeable the latter two. The present invention aims at solving this difficulty and attaining the interchangeability between the cassette typed tape cartridge and the others. To obtain this interchangeability the cassette type tape cartridge fits in an adapter, the external form of which is the same as that of Fideli Pac or Lear Jet tape cartridge. The adoption of such an adapter permits the cassette cartridge to engage with or disengage from the tape player, like the Fideli Pac or Lear Jet tape cartridge, and to utilize the tape player to conventional cartridge of Fideli Pac or Lear Jet, thereby usefully obtaining the above mentioned interchangeability. This invention has the relation to the playing method and its equipment in the tape player, and this engages or disengages the tape cartridge with housed-in tape with or from the tape player, and is to provide a new and advantageous playing method in such a system as plays by this engagement of the tape cartridge.

Another object of this invention is to enable to play the above stated cassette typed tape cartridge by using the same external adapter to Fideli Pac or Lear Jet tape cartridges. The preservation and housing of such as adapter are done by the same treatment in the conventional Fideli Pac or Lear Jet tape cartridges, besides such an adapter is fitted to a voluntary cassette typed tape cartridge, thereby desirably playing.

Still another object of this invention is to make it possible that in the condition of taking out an adapter partially from the playable state the cassette type tape cartridge furnishing inside of said adapter is exchanged, thereby exchanging instantly and exactly the cassette type tape cartridge, not taking out the adapter at each time to easily operate.

Further another object of this invention is to wind back on the other reel the tape which has been finished to play and has been wound on another reel, thereby making it easy to repeat to play on the same tape.

Another object of this invention is to enable to feed rapidly at winding back the tape from the one reel to another reel, thereby performing the rapid winding back operation and repeating to play promptly.

Another object of this invention is to embody the above mentioned various objects of this invention with easier and productive adapter, thereby widely making possible the playing of the cassette type tape cartridge with such an adapter.

The final and important object of this invention is to make it possible to use any type tape cartridges now sold on the one tape player. It is well known that there is the interchangeability between the Lear jet and the Fideli Pac type tape cartridges and it has been generally utilized. The present invention adapts such an adapter according to Fideli Pac or Lear Jet tape cartridge and makes it possible to play with the cassette type tape cartridge which is quite different from them, which proves that the tape player adopting the adapter can apply as to the above mentioned Lear Jet or Fideli Pac tape cartridge and therefore which means that any tape cartridges now generally used can be efficiently played with the one tape player, and the interchangeability is greatly developed and improved.

Many other features, concrete composition and functional referring to the embodiment of this invention illustrated in the attached drawings: in which.

Figures 1, 2:
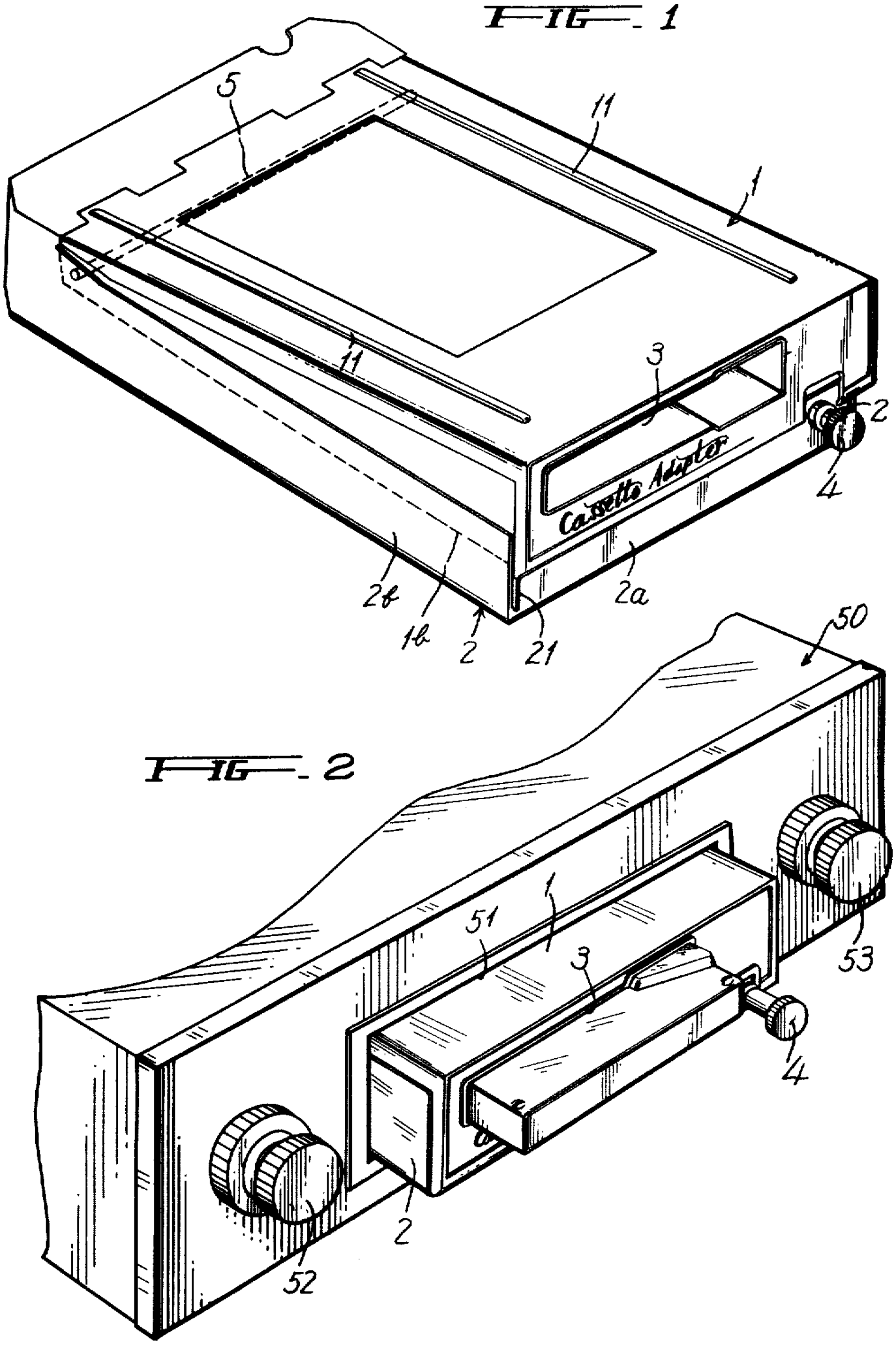
FIG. 1 shows a perspective view of of one embodiment of the adapter used in this invention.
FIG. 2 shows partially a perspective view of the fitting the above adapter into the tape player.

To explain the embodiment of the present invention with reference to the attached drawings: As partially shown, in FIG. 2, the present invention utilizes a tape player 50 which is sold to adopt Fideli Pac or Lear Jet cartridge. To further explain, the differences between Fideli Pac and Lear Jet tape cartridges are only that the pinch roller is housed in the cartridge or is provided in the tape player, and that the pinch roller is or is not in the inner structure of the tape player, and that the hole for putting up and down the pinch roller housed in the tape player is or is not in the cartridge. However those differences are not substantial in the form of the cartridge and can be solved by the device to stop putting up the pinch roller equipped in the tape player when the Fideli Pac tape cartridge is inserted into the tape player. There have been various proposes for applying the same tape player to Lear Jet cartridges as well as Fideli Pac cartridge, and to take up for example the one shown in FIG. 2 this is, as stated above, for the exclusive use of Fideli Pac or Lear Jet and for the both uses of the two types. There is in the front side of the tape player 50 the cartridge engaging-disengaging hole 51 and in the both sides thereof the well known adjust operating controls 52 53, which are similar to the conventional controls. Fideli Pac or Lear Jet tape cartridges can be inserted into said cartridge engaging-disengaging hole 51, thereby enabling the playing thereof.

Figure 4:
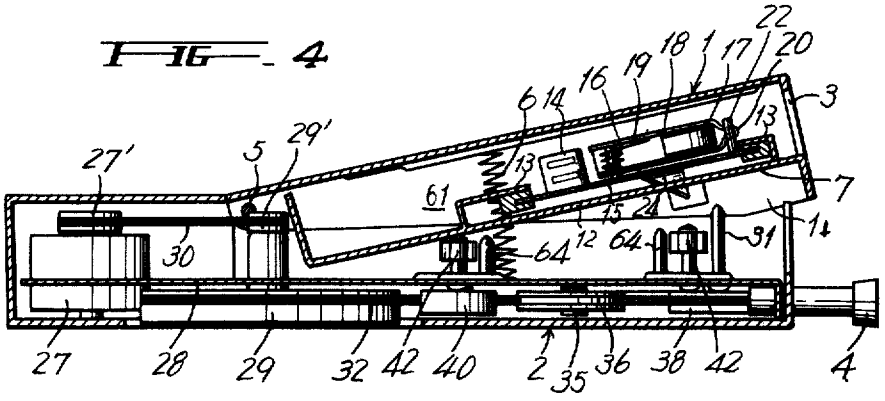
FIG. 4 shows the vertical section-side view in which the adapter is not inserted into the tape player.
Figure 5:
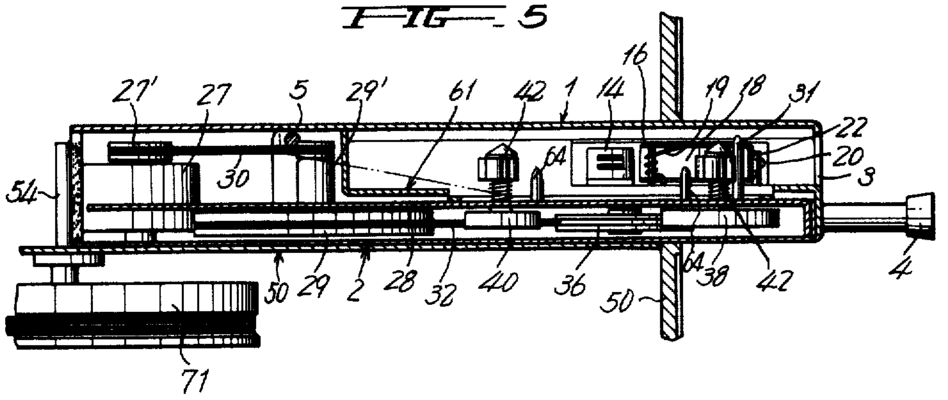
FIG. 5 shows the vertical section-side view in which the adapter is inserted into the tape player.

The present invention adopts the adapter, the vertical as well as horizontal cross section of which are almost the same as that of the conventional cartridge of Fedeli Pac or Lear Jet in order to apply the above mentioned cassette typed tape cartridge to said tape player 50. That is to say, the case consists of the upper case 1 and the lower case 2 and its form is the same as that of the Lear Jet tape cartridge 2n the front side of the upper case 1 is provided an aperture 3 for the engagement and disengagement of the cassette typed tape cartridge. 2n the lower case 2 fitting to said upper case 1 there is a drawer of the cassette type tape cartridge and a push button 4 serving as rapid returning operation described hereinafter mentioned after. The upper case 1 and lower case 2 are pivotally connected by the shaft 5, and a spring 6 is provided as shown in FIG. 4 between the both cases 1 2 thereby tending to retain the aperture 3 of the upper case 1, facing upwards with the shaft 5 a pivot center. On the front wall 2*a* of said lower case 2 there is a recess 21 formed to accept the side wall 1*b* of the upper case 1, and when the upper case 1 is pressed to the lower case 2 against the elastic force of a spring 6 the upper case 1 is to be pressed down till its top is parallel with the bottom of the lower case 2. There is provided on the top of the upper case 1 rails 11 which guide the engaging and disengaging of the adapter in the engaging-disengaging hole 51.

Figure 6:
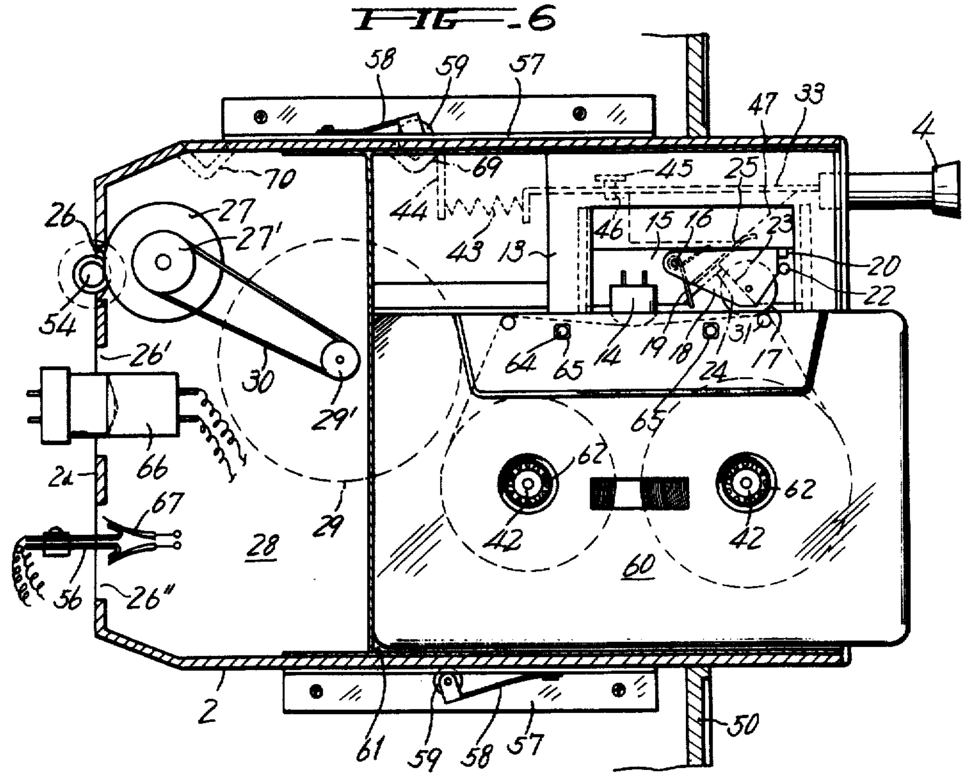
FIG. 6 shows the cross-sectional plan view in which the cassette type tape cartridge is inserted into the adapter shown in FIG. 5.

To explain the inner construction of the upper and lower cases; the inner part of the upper case 1 is provided with the bottom plate 12 on which there is formed an engaging-disengaging compartment 61 of the cassette type cartridge 60. This engaging-disengaging compartment 61 is provided with C-type guiding frames 13 which a sliding bed 15 is slidably positioned in its vertical direction as shown in FIG. 6, and on said sliding plate 15 the holding frame 18 having a pinch roller 17 is pivotally mounted by means of a pivot shaft 16. Said holding frame 18 always works in the clockwise direction due to the elastic material 19 arranged in said pivot shaft 16 and when a point 20 of the holding frame 18 engages with a pin 22 fitted on the sliding bed 15, the working force is stopped at this point place. Said sliding plate 15 has a cut portion 23 in its edge, which is bent downwards to form a triangle so that an attaching seat 24 is formed on which a guide piece 25 is fixed as shown in FIG. 4 or FIG. 6.

Figure 3:
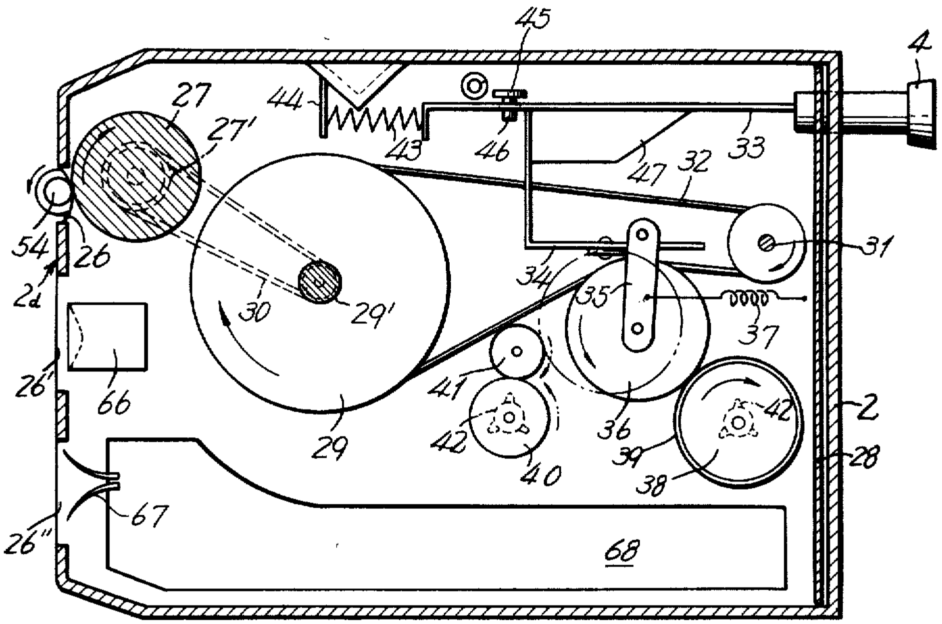
FIG. 3 shows the cross-sectional plan view of the bottom case portion of the adapter shown in FIG. 1.
Figure 7:
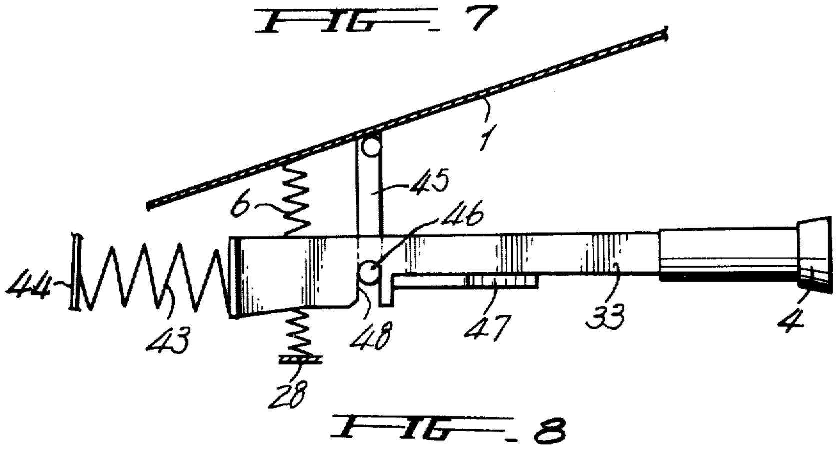
FIG. 7 shows the sectional side view of the push button operation of the adapter.
Figure 8:
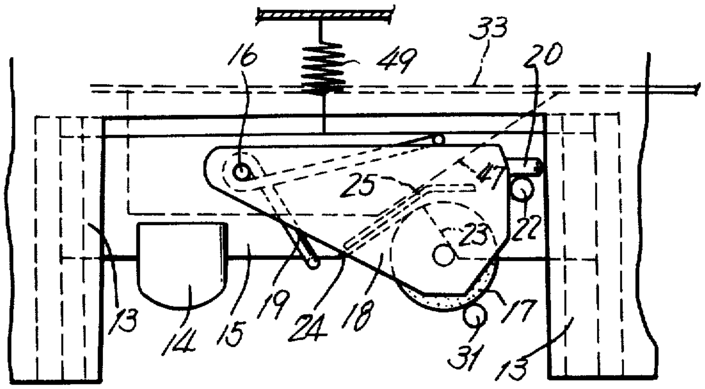
FIG. 8 shows the plan view of the sliding plate and bed-parts to the guiding frame of the adapter.
Figure 9:
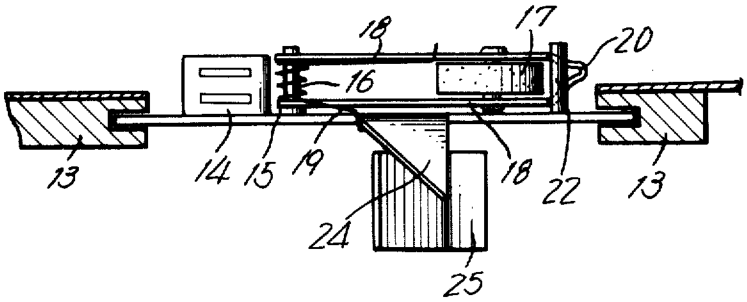
FIG. 9 shows the side view of FIG. 8.

The structure of the lower case 2 corresponding to that of the upper case 1 is that as shown in FIG. 3 the inserting face 2*d* is furnished respectively with apertures 26 26′ 26″ for capstan 54, head 55 and detector 56. The pinch roller 27 is pivoted at the aperture 26 and a belt is wound between a small wheel 27′ concentric with and connected to said pinch roller 27 and a rotor 29′ of the flywheel arranged on the base of the seat plate 28, and further the second belt 32 is also wound between said flywheel 29 and the capstan shaft 31 provided in the front side of the lower case 2. Said belt 32 contacts at its center portion with a transmitting wheel 36 equipped on the holding member 34 by means of a holding arm 35, the holding member 34 being connected at the center part of the controlling piece 33 having said push button 4. This transmitting wheel 36 is always retained by the spring 37 connected to said holding arm a rubber or other elastic wheel 39 is mounted on the circumference of the cassette driving wheel 38, in which a mounting piece 42 mmounting on a driving hole 62 of the cassette 60 is fixed as shown in FIG. 6. FIG. 3 or FIG. 7 illustrates that the elastic material 43 is arranged between the point of the controlling piece 33 and the supporting wall 44 providing on the inside of the lower case 2 and this elastic force always pushes the controlling piece 33 outward from the case 2. This pushing force on said controlling piece is such that the rotor 46 on the end of the pending piece 45 which pendent from said upper case 1 is engaged with the engaging slot 48 under the condition that the upper case 1 is open as shown in FIG. 7. The upper case 1 is pushed upward by the spring 60 so that the pushing amount of the controlling piece 33 and the push button 4 is fixedly limited. Said controlling piece 33 has a cam piece 47 fixed on the base thereof facing the guiding piece 25 of said sliding plate 15 (refer to FIG. 6). Therefore when the upper case 1 is pushed down from said condition so that its top is parallel with the bottom of the lower case 2, the rotor 46 of said pending piece 45 is out of the engaging slot 48 of the controlling piece 33, whereby the elastic material 43 works to push the controlling piece 33 to the front side, and in this way when the controlling piece 33 advances, the cam piece 47 works on the guiding piece 25 so that the sliding plate 15 which is caused to retreat from the cassette typed cartridge-inserting compartment 61 by the spring 49 as shown in FIG. 8 is pushed to the direction of said inserting compartment 61. A head 14 and a pinch roller 17 are inserted in the cassette typed cartridge 60 provided in said chamber 61 so as to form a relation enabling the playing of the tape. When the capstan 54 of the tape player 50 is driven as conventionally, through the flywheel 71 with a driving source such as a motor under such a condition, the capstan 31 feeds at fixed speed a tape which contacts it as shown in FIG. 6 while a pinch roller 17 rotates to feed the tape therebetween to the front of the head 14 through the operation of pinch roller 27, belt 30 flywheel 29 and belt 32, and at the same time as shown in FIG. 3 the other driving wheel 38 having a mounting piece 42 is driven through the transmitting wheel 36 so that the tape fed by said capstan 31 and the pinch roller 17 is wound desirably.

The lower case 2 is equipped in its inside with another driving wheel 40 which is smaller in the diameter than said driving wheel 38 and which has another mounting piece 42 and is in a row with the driving wheel 38. A small transmitting wheel 41 is contacted by said driving wheel 40 and these rotating wheels 40 41 are usually free as shown in FIG. 3. When said driving wheel 38 is driven to feed the tape so as to play the same, the tape on the reel mounted with the mounting piece 42 of said driving wheel 40 is voluntarily wound back, and being in such a condition, in order to advance the controlling piece 33 by pressing the push button 4 against the spring 43, the transmitting wheel 36 provided on said controlling piece 33 through the holding member 34 is released from the connecting relation with the driving wheel 38 and is connected with said little transmitting wheel 41 thereby rotating said rotating wheels 40 41 respectively in the arrowed direction, i.e. the tape wound on the played driving wheel 38 is able to be wound back on the driving wheel 40. As this winding back-work is effected by the transmitting wheel 36 drives the driving wheel 40 through the little rotating wheel 41 the driving wheel 40 smaller in diameter than the driving wheel 38 rotates far faster than the driving wheel is driven, though the transmitting wheel 36 rotates at fixed rate, and the so-called rapid winding back structure is formed, thereby rapidly winding back the tape to be ready for the next playing thereof. The place fixing pins 64 64 are equipped as shown in FIG. 4 on the lower case 2, and when the cassette type tape cartridge 60 which has been inserted into the inside of the upper case 1 from the aperture 3 is lowered by the downward pushing of the upper case 1, these pins 64 are inserted together with the mounting pieces 42 42 into the holes 65 of the cassette type cartridge 60 and at the same time the capstan shaft 31 is also inserted so that the stable playing relation of the cartridge 60 is formed.

There is formed in one side of the lower case 2 the circuit housing part 68 which consists of transistors and so forth, and there are respectively provided at the apertures 26′ 26″ the head 66 opposite to the head 55 of the tape player and the contacting point member 67 opposite to the detector 56 which are not especially drawn because of the complication in the drawing, and the elastic connection is formed by the wiring and is connected to the circuit of said circuit housing part 68, and this circuit is also connected electrically to the head 14 in said adapter. As shown in FIG. 6 two guiding metals 57 57 are as well known opposite each other at the inside of the engaging-disengaging holes 51 of the tape player 50, and between these guiding metals 57 57 the lower case 2 is to be engaged and disengaged similarly as the usual Lear Jet or Fideli Pac cartridge is done. These guiding metals 57 57 are provided with elastic materials 58 and the ends of these elastic materials 58 are equipped with the mounting rotors 59 which are inserted into the 1st and 2nd concave portions 69 70, thereby obtaining the playing and stopping relation. The adapter, the vertical cross section as well as horizontal cross section of which are almost the same as those of the usual Fideli Pac or Lear Jet tape cartridge, is treated just the same as those cartridges at treating as housing, preservation or the commercial goods, besides by using one adapter any of the cassette type tape cartridges are voluntarily exchanged to play.

Figure 10:
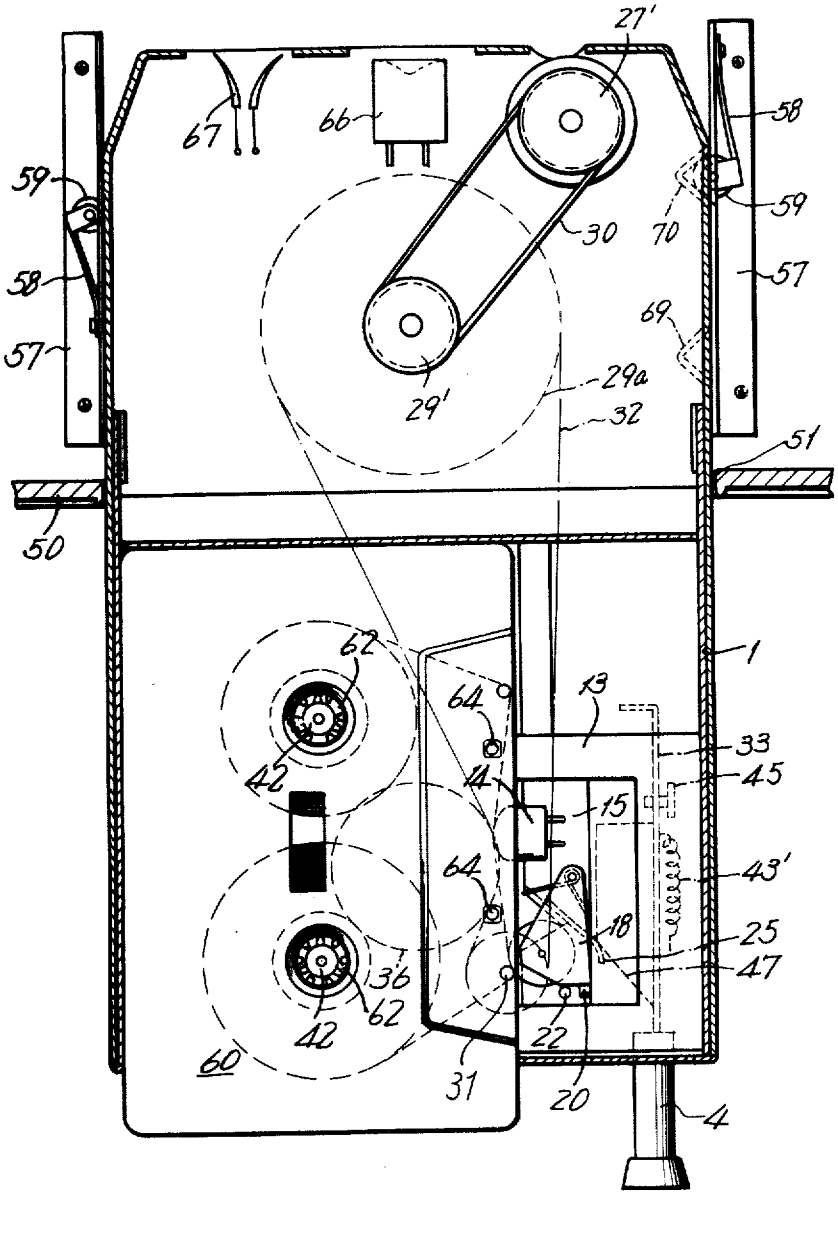
FIG. 10 shows the cross sectional plan view of the 2nd embodiment of the present invention.
Figure 11:
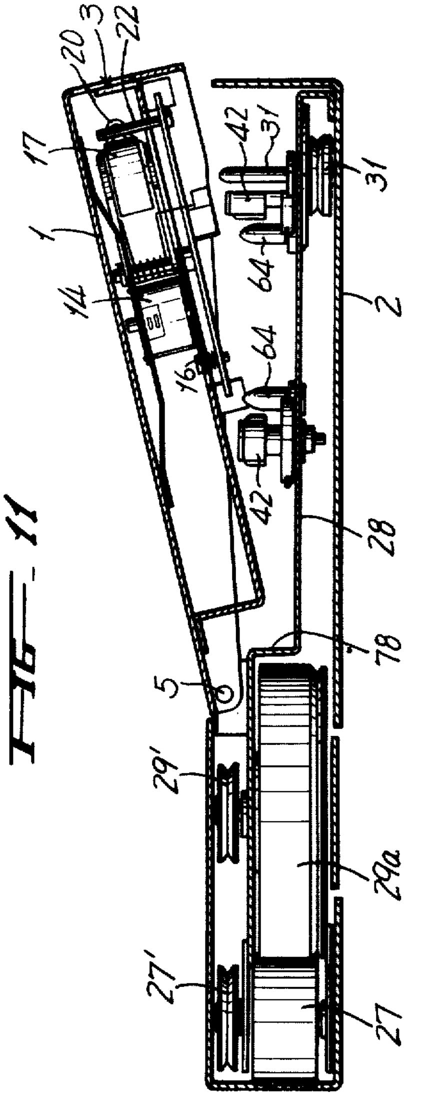
FIG. 11 shows the vertical sectional view of FIG. 15.

FIGS. 10 and 11 show the 2nd embodiment of the present invention. That is to say, in FIGS. 1 to 9 the adapter consisting of the upper case 1 and the lower case 2 so designed as to be smaller and said adapter is housed in the same size as those of the prior Fideli Pac or Lear Jet tape cartridge, and therefore said adapter may be treated and preserved similarly as those cartridge. However in such a compact adapter if the adapter is not taken away from the tape player, the cassette type tape cartridge cannot be taken off and exchanged because of the arrangement of each of said composing members. In the 2nd embodiment shown in FIGS. 10 and 11, said disadvantage has been solved. The upper case is opened under the condition that the adapter is partially inserted into the engaging-disengaging hole 51 of the tape player to be held, and the cassette typed tape cartridge therein is to be taken out and exchanged. The construction itself relating to the upper case 1 is the same as that shown in FIGS. 1 to 9, and even if different, it is that the spring arranged on the controlling piece 33 shown in FIGS. 1 to 9 is the pressing one while this embodiment uses the drawing one and the size is the same, which has been described.

The lower case 2 shown in FIGS. 10 and 11 is longer than that of FIGS. 1 to 9, i.e. it is as long as twice that of the upper case 1 and therefore the upper case 1 covers only the front side of the lower case and the inner part is covered with the top of the lower case itself. The upper case 1 and the lower case 2 are pivoted with the pivot shaft 5. The seat plate 28 provided in the inside of the lower case 2 is heightened at the step 78 as shown in FIG. 11 and the flywheel 29*a* is provided therebetween. The seat plate is as shown in FIGS. 1 to 9 provided with the driling shaft having a mounting piece 42, the capstans 31 and the rotors thereof, and the belts 30 32 are wound round therebetween to drive as shown in FIGS. 1 to 9.

The operation and the working are the same as in FIGS. 1 to 9, but in FIGS. 10 and 11 the lower case 2 being formed fairly long and when partially drawn out of the inserting hole 51 of the tape player 50 and when the engagement with the 2nd engaging concave 70 is formed from the engagement of the mounting piece 59 with the 1st engaging concave 69 at inserting, it is obvious that the upper surface of the upper case 1 is drawn out of the tape player, and therefore in this condition the upper case 1 is freely opened. In this way it is unnecessary to draw out the adapter out of the tape player at each time and the cassette typed cartridge 60 is can taken out under the condition of half-inserting to exchange smoothly.

Figure 12:
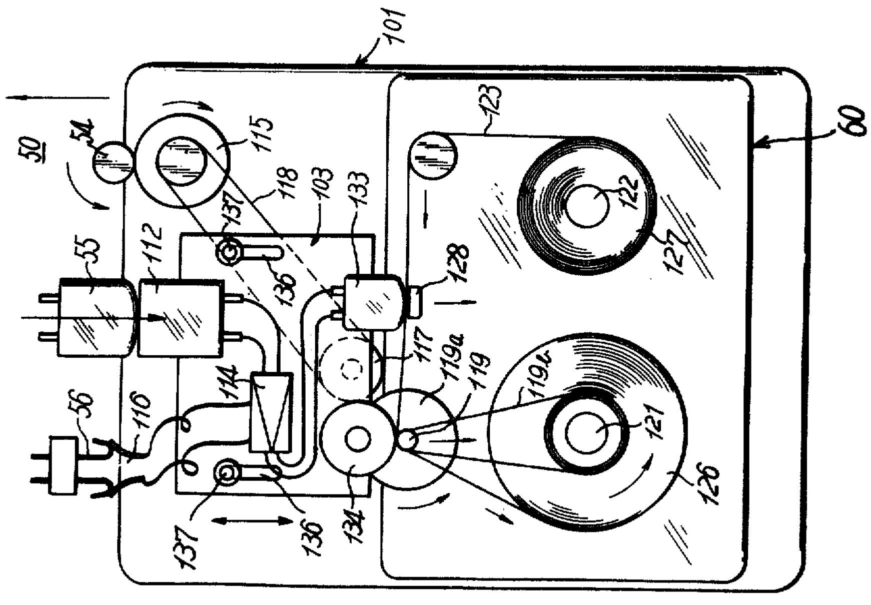
FIG. 12 shows the plan view of the 3rd embodiment of the present invention.

FIG. 12 and the rest show the 3rd and 4th embodiments accoding to the present invention, being a little different. These forms are the same as those of the Fideli Pac or Lear Jet tape cartridge. Especially they are composed of the cassette type tape cartridge 60 and the adapter 101, the vertical cross section of which is the same in the form and the size, while the embodiments of FIGS. 3 and 4 have the removing plate 103 fitted on said adapter 101, that is to say, the 3rd embodiment of FIG. 12 is that the removing plate 103 having long holes 136 136 in the adapter 101 is slidably equipped by means of guide pins 137 137 on the adapter 101, and these embodiments provide an amplifier 114, a playing back head 133 and a pinch roller 134 as well as have an electro-magnetic connecting coil 112 connected to the amplifier 114. The adapter 101 pivots the upper and lower cases as similarly in FIGS. 1 to 11, which has been already described and therefore is not shown in FIG. 12 and the rest. Such an adapter 101 provides the pinch roller 115 and the connector 116 respectively opposite to the capstan 54 and the detector 56, and said connecting coil 112 is placed between these pinch roller 115 and connector 116, and when this adapter 101 is inserted into the player 50 the connecting coil 112 is to be pressed to the head 55 of the player 50. The belt 118 is wound between the pinch roller 115 and the transmitting wheel 117 and the transmitting wheel 117 contacts to the cylindrical wheel 119*a* of the capstan 119. Another belt 119*b* is wound between the capstan 119 and the reel shaft 121 to be mounted on the reel 126 of the cassette 102 so that the reel shaft 121 is driven to rotate the reel 126. Another reel 127 of cassette 102 is provided with a free shaft 122 in order that the tape 123 wound on the reel 127 is wound due to the rotation of said reel 26 on the reel 126 through the front of the play back head 133 and when this cassette 102 is taken out to be changed its head and bottom the previous place is converse so that the tape 123 wound on the reel 126 is wound on the reel 127.

To explain the embodiment as to its use and its operation; When the adapter 101 is taken out of the player 50 the removing bed 103 is as drawn forward of the adapter 101 by the action of a spring or other elastic material, and therefore in such a condition the play back head 133 and the pinch roller 134 remove to the upward of the drawing thereby enabling to mount the reels 126 127 of the cassette 60 on the reel shafts 121 122 without difficulties. When after mounting the cassette 60 on the adapter 101 in this way this cassette 60 is mounted on the player 50, the adapter 101 is fully drawn to the capstan 54, detector 56 and head 55 by means of voluntary drawing means such as mounting rotor 59 equipped in said elastic material 58 shown in FIG. 6 or FIG. 10 and the stopping concave 69 having a taper face which corresponds to the Fideli Pac or Lear jet cartridge provided on the player 50, thereby forming a connecting relation as shown, so that the removing plate 103 is drawn to the front side and then its pinch roller 134 and play back head 133 are exactly connected to the tape running along the capstan 119 and the pad 128 to form a playable relation. The playing back output obtained at the play back head 133 is to be sent from the head 55 of the player 50 to the well known speaker through the amplifier 114 and connecting coil 112.

Figure 13:
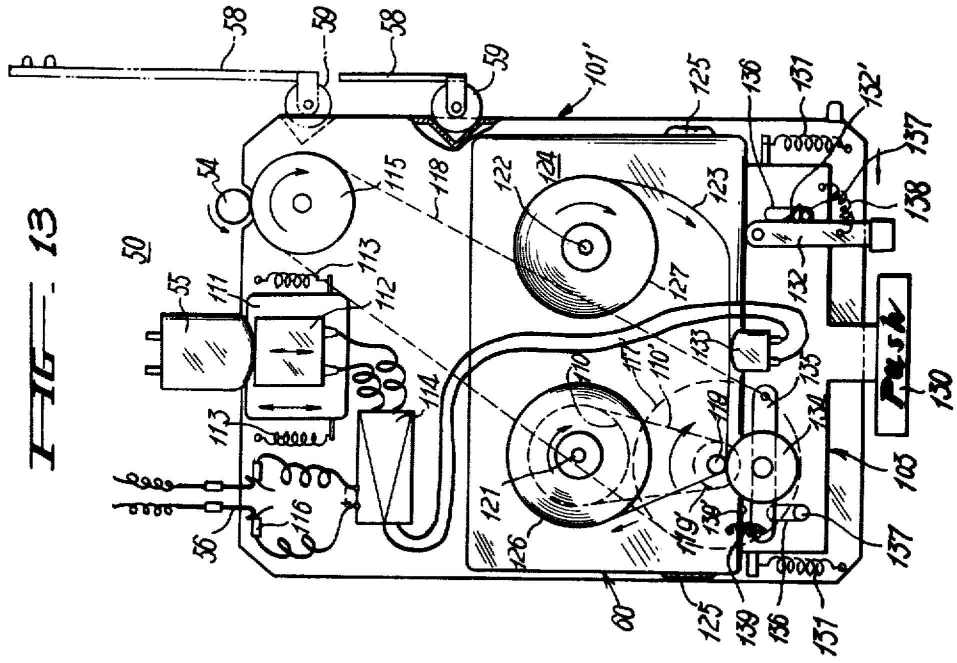
FIG. 13 shows the plan view of the 4th embodiment of the present invention.

The structure of the one shown in FIG. 12 has been further developed to adapt to the productivity, which is shown in FIG. 13. That is to say, its structure is that there are arranged a transmitting rotor 115, connector 116 and a 2nd removing plate 111 in the adapter 101' to be engaged with or disengaged from the engaging -disengaging hole of the conventioanlly known Fideli Pac or Lear Jet tape cartridge provided on the tape player 50. The elastic members 113 113 are furnished on the both sides of this removing plate 111 whereby when the adapter 101' is inserted into the player 50 the connecting system 116 is pressed to the detector 56 and the transmitting wheel 115 is pressed to the capstan 54 of the player as well as the connecting coil 112 on said removing plate 111 is also pressed to the head 55 of the player 50. Said connecting coil 112 is electrically connected to the play back head 133 of the removing plate 103 provided on the front side of the adapter 101' through the amplifier 114. An endless belt 118 is wound between said transmitting rotor 115 and the pulley 117' of the capstan 119 equipped on the adapter 101' and another belt 110' is wound round between the small pulley 119' concentric with and connected to the capstan 119 and the rotor 110 of the driving shaft 121 to mount on the reel 126 of the cassette 60. A free shaft 122 is mounted on another reel 127 of the cassette 60 and in the drawing the rotation of said reel 126 is to permit the tape 123 to be wound in the direction of the reel 126 from this reel 127. If, after taking off the case 124 of this cassette 60, the head and the bottom are changed to put the reel 127 on the driving shaft 121 and to put the reel 126 on the free shaft 122, the previous state will be converse so that the tape 123 drawn from the reel 126 is to be wound on the reel 127. Furthermore said removing plate 103 is provided with a pushing portion 130 and is pivoted with a head releasing lever 132 on which an engaging projection 132' is to be engaged with and disengaged from a guiding plate 137 fitted in the long hole 136 formed along the removing direction of the removing plate 103. The other side of this removing plate 103 is provided with another long hole 136 in which a guiding piece 137 is also fitted as stated above so that this sliding plate 103 is slid in the plan direction to the adapter 101'. There are respectively equipped the springs 131 between the both sides of the removing plate 103 and the adapter 101' to always draw the removing plate 103 to the front side of the adapter 101, but the driving shaft 121 and the free shaft 122 are mounted on the reels 126 127 of the cassette 60 and after then the pushing portion 130 is pushed so that the removing plate 103 is advanced against the elastic force of the springs 131 131, thereby pressing the play back head 133 to the plate 103, and a pinch roller 134 on the medium of the link 135 is pressed to the capstan 119 passing through the cassette 60 in the condition that the tape 123 is put between them. Such a state is ensured by that the engaging projection 132' of the releasing lever 132 engages with the engaging piece 137. The other end of said link 135 is equipped with a spring 139 to always draw the pinch roller 134 to the capstan 119, but since a stopper 139' is formed on the removing plate 103 the pinch roller does not advance more than the settled place. Said pushing button 130 is pushed up to the condition that the link 135 is apart from this stopper 139' and the pinch roller 134 pressed the tape 123 owing to the elastic force of the spring 139. The player 50 has an elastic piece 58 equipped with the engaging rotor 59, which holds, in real lined state, the adapter 101' under the condition that this adapter 101' is partially drawn, wherein the cassette 60 is in the place where the player 50 is completely exposed. In such a state the exchange or replacement of the cassette 60 can be freely performed, and when the adapter 101' is further advanced from such a state, said rotor 59 engages with the 2nd engaging portion 70 of the adapter 101', thereby constituting the real lined playing relation.

To explain the embodiment shown in FIG. 13 as to the work; At the insertion of the adapter 101' it is obvious that the connecting coil 112 on the removing plate 111 is efficiently pressed to the head 55 by the drawing force of the springs 113 113, and after fitting the cassette 60 to this adapter 101' the push button 130 is inserted so that the removing plate 103 advances and the play back head 133 connects to the tape 123 and the pinch roller 134 is pressed to the capstan 119, and thus the playable relation is constituted besides such a playable relation is supported at the settled place and permits to efficiently play by that the engaging part 132' of the releasing lever 132 on the removing plate 103 engages with the guiding piece 137. For exchange or replacement of the cassette 60 the releasing lever 132 is pressed to the left in the drawing, thereby releasing the engagement of the engaging part 132' and the guiding piece 137, and as the removing plate 103 is retreated by the drawing force of the springs 131 131 the play back head 133 and pinch roller 134 are released from the cassette 60 and in this way this cassette 60 can be exchanged or replaced without wny difficulties. In connection with this case, when the adapter 101' is a little drawn the rotor 59 of the elastic piece 58 is placed in the imaginary line, the cassette can be exchanged or replaced in the condition that it is taken out of the player 50, which has been described.

Figure 14:
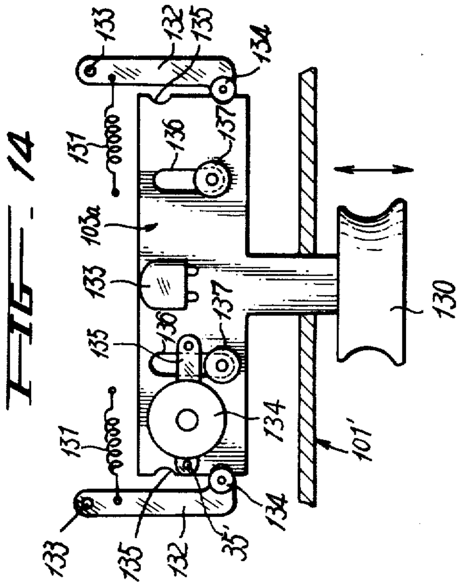
FIG. 14 shows the plan view of the pressing operation.

FIG. 14 shows another embodiment of the removing plate according to the present invention; That is to say, in FIG. 14 the removing plate **103*a* having the play back head 133 is provided with pins 137 137 inserted in the guiding holes 136 136 to the adapter 101', and said plate 103*a* is to be removed forwards or backwards by the press or draw of the push button 130, and is respectively arranged on its both sides with the engaging lever 132 whose base ends are pivoted. These engaging levers 132 are furnished with springs 131 as well as with the rotors 134 on the points thereof, and these rotors 134 are engaged with or disengaged from a plurality of engaging portions 135, thereby supporting the removing plate 103*a* at the advance or draw position. The pinch roller 134 is equipped on the lever 135, which is pivoted 135' and is pressed to the above stated capstan 119 by removing as mentioned above the pins 137 long the guiding holes 136, which is the same as that of FIG. 13.**

Figure 16:
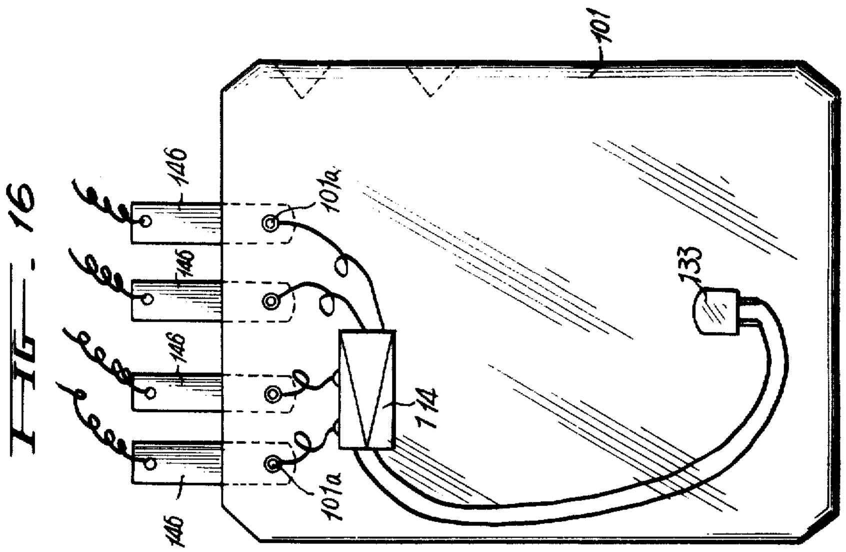
Figure 15:
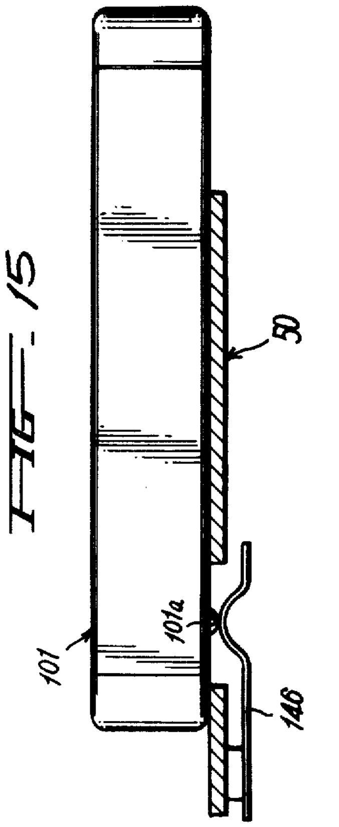
FIG. 15 shows the sectional view illustrating one embodiment of the contacting point system; and, FIG. 16 shows the plan view of the above.

In connection with that of FIG. 12 and FIG. 13, the lead wire connects the amplifier to the electric source and connecting coil 112 and others, and if necessary, the desired connecting points **101*a* are formed on the base of the adapter 101 as shown in FIGS. 15 and 16 and the elastic connecting pieces 146 equipped on the player 50 face to these connecting points 101, i.e. when the adapter 101 is inserted this elastic connecting piece 146 may be connected to said connecting points 101*a*.**

We claim:

1. An adapter for playing a cassette type tape cartridge in a tape player for endless tape cartridges comprising a detector, an adapter housing at least the vertical cross-section of which is the same as that of the endless tape cartridge, and having a compartment for the cassette type tape cartridges, a head mounted in said housing, a tape feeding capstan mounted in said housing, means for electrically connecting said head to a head in the tape player, means for driving said capstan being connectable to the tape player capstan drive, and a pair of driving wheels positioned for engaging with the reel shafts of an inserted cassette type tape cartridge, wherein said housing has pivotally connected upper and lower cases, the upper one of said cases including said compartment and means for driving said driving wheels arranged in the other of said cases, including a sliding plate mounted in said upper case, a holding frame pivotally mounted on said sliding plate, a head on said holding frame, a pinch roller on said holding frame, a guiding piece on said holding frame, a push button operable controlling piece slidably extending through said lower case, a cam carried by said controlling piece positioned for engaging said guiding piece when said cases are together to permit the manual movement of said sliding frame and thus said head and pinch roller to operative engagement with the tape of an inserted cartridge.

2. An adapter as claimed in claim 1 including a flywheel in said lower case, a rotatably mounted wheel positioned for being engaged by the capstan of a tape player, a belt extending around said flywheel and said wheel, a second belt extending around said flywheel and said capstan, a transmitting wheel rotatably carried by said controlling piece positioned for engaging said second belt, and moveable with said controlling piece for engaging either of said driving wheels.

3. An adapter as claimed in claim 1 means carried by said upper case for retaining said controlling piece from movement when said cases are apart, resilient means tending to move said controlling piece with said transmitting wheel against one of said driving wheels and said retaining means being releasable from said controlling piece upon the closing of said cases together whereby said transmitting wheel can be manually moved to the other of said driving wheels.

4. An adapter for playing a cassette type tape cartridge in a tape player for endless tape cartridges comprising a detector, an adapter housing at least the vertical cross-section of which is the same as that of the endless tape cartridges, and having a compartment for the cassette type tape cartridge, a head mounted in said housing, a tape feeding capstan mounted in said housing, means for electrically connecting said head to a head in the tape player, means for driving said capstan being connectable to the tape player capstan drive, and a pair of driving wheels positioned for engaging with the reel shafts of an inserted cassette type tape cartridge, wherein said housing has pivotally connected upper and lower cases, the upper one of said cases including said compartment and means for driving said driving wheels arranged in the other of said cases, including a removing plate slideably mounted in the adapter housing, a connector positioned on said removing plate for connection to the detector of the type player, an electric connection coil positioned on said removing plate for connection to the head of the tape player, an amplifier on said removing plate connected electrically to said connector, coil and said head of the adapter and a pinch roller on said removing plate positioned for contacting the capstan for feeding the cartridge tape.

5. An adapter for playing a cassette type tape cartridge in a tape player for endless tape cartridges comprising a detector, an adapter housing at least the vertical cross-section of which is the same as that of the endless type cartridge, and having a compartment for the cassette type tape cartridge, a head mounted in said housing, a tape feeding capstan mounted in said housing, means for electrically connecting said head to a head in the tape player, means for driving said capstan being connectable to the tape player capstan drive, and a pair of driving wheels positioned for engaging with the real shafts of an inserted cassette type tapes cartridge, wherein said housing has pivotally connected upper and lower cases, the upper one of said cases including said compartment and means for driving said driving wheels arranged in the other of said cases, including an electro-magnetic connecting coil, a removing plate slideably mounted in said adapter housing and carrying said head and pinch roller for engaging the inserted cartridge tape.

6. An adapter as claimed in claim 5 including a push button extending through the housings for said second removing plate for controlling the removal and operation of an inserted cartridge, guide pins in said housing, slots in said removing plate having said pins therein and an engaging lever pivotally mounted on said second removing plate and capable of engaging one of said pins for retaining said second removing plate advanced towards an inserted cartridge.

7. An adapter as claimed in claim 5 wherein said second removing plate has side recesses, levers pivotally mounted and resiliently held against said second removing plate sides whereby said second push button can be manually moved to retain said second removing plate to or from an inserted cartridge.

* * * * *